July 29, 1958  C. R. STELLJES ET AL  2,844,965
WASHING MACHINES
Filed Feb. 18, 1953  2 Sheets—Sheet 1

INVENTORS
CHARLES R. STELLJES
JOHN P. FLANNERY
BY
ATTORNEY

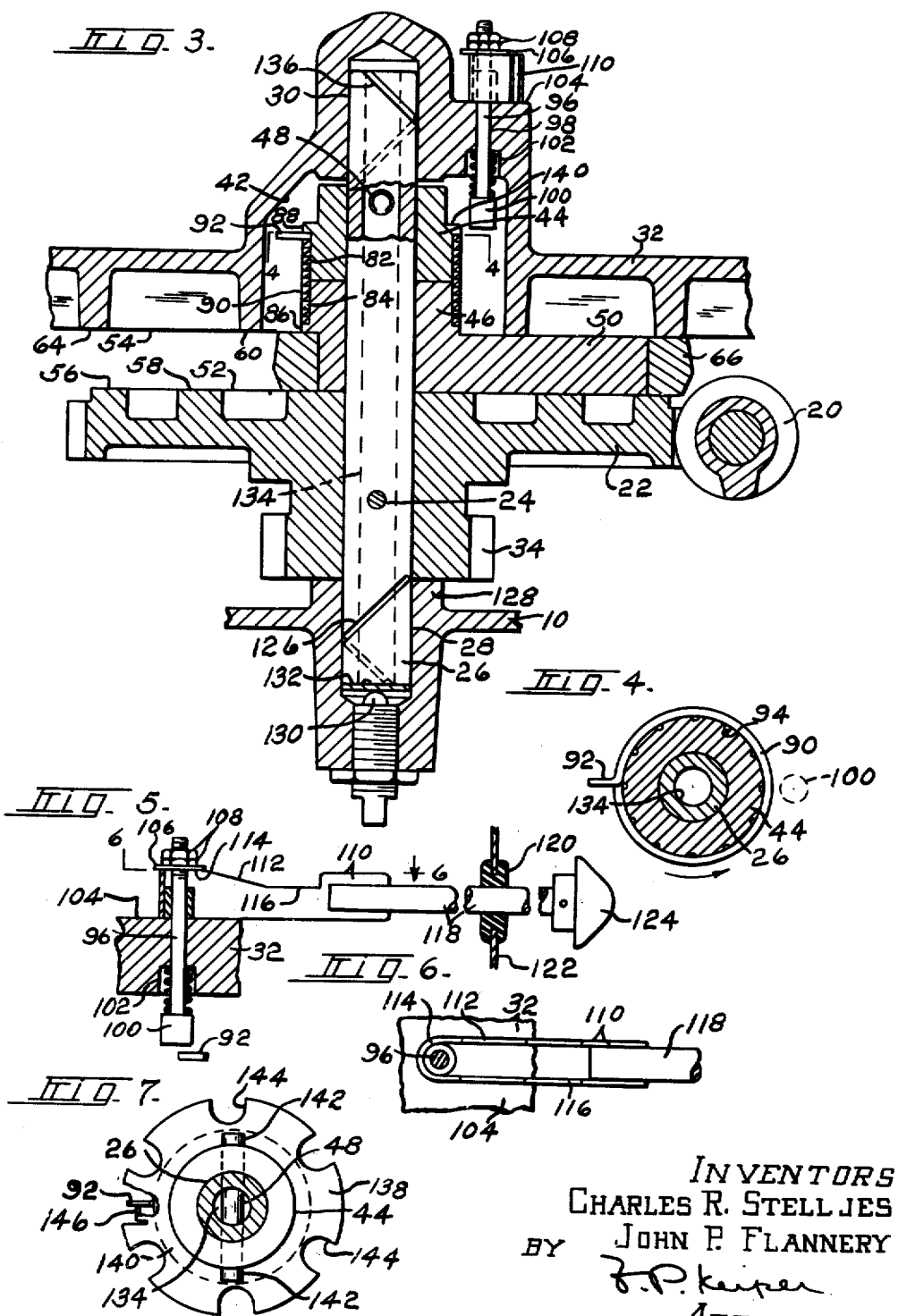

United States Patent Office 2,844,965
Patented July 29, 1958

2,844,965
WASHING MACHINES

Charles R. Stelljes, Fayetteville, and John P. Flannery, Syracuse, N. Y., assignors, by mesne assignments, to The Murray Corporation of America, Detroit, Mich., a corporation of Delaware Application February 18, 1953, Serial No. 337,546

3 Claims. (Cl. 74—70)

This invention relates to washing machines, and more particularly to a clutch mechanism manually controllable for stopping or starting the oscillatory motion of an agitator.

In Geldhof Patent No. 2,111,143, there is disclosed a clutch mechanism for a washing machine agitator drive wherein a slidable pinion is provided with a castellated collar adapted to be engaged or disengaged from an agitator cross pin. In order to shift such collar upon the shaft by a manual control, a relatively heavy biasing spring must be compressed, and the sliding friction of the gear teeth, of the pinion on the shaft, and of the castellated collar on the pin, must be overcome, requiring considerable leverage, as well as many parts.

The present invention is directed to a simplified control wherein the torque for driving the agitator is utilized to engage the clutch, and in which release is effected by merely shifting a stop. The invention further has to do with dividing the common worm wheel and eccentric, commonly in practice formed integral, and providing a common wrap-around spring for causing driving engagement between the two when desired. Further, the invention has to do with providing adequate oiling means for the clutch, and providing a simplified control for causing engagement and release of the wrap-around spring.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 3 is a sectional view taken through the eccentric and clutch substantially on the line 3—3 of Figure 2;

Figure 4 is a sectional view taken substantially on the line 4—4 of Figure 3;

Figure 5 is a fragmentary detail view, partly in section, of the control;

Figure 6 is a fragmentary horizontal sectional view taken on the line 6—6 of Figure 5; and Figure 7 is a modified form, including a clutch-actuating link.

Figure 1:
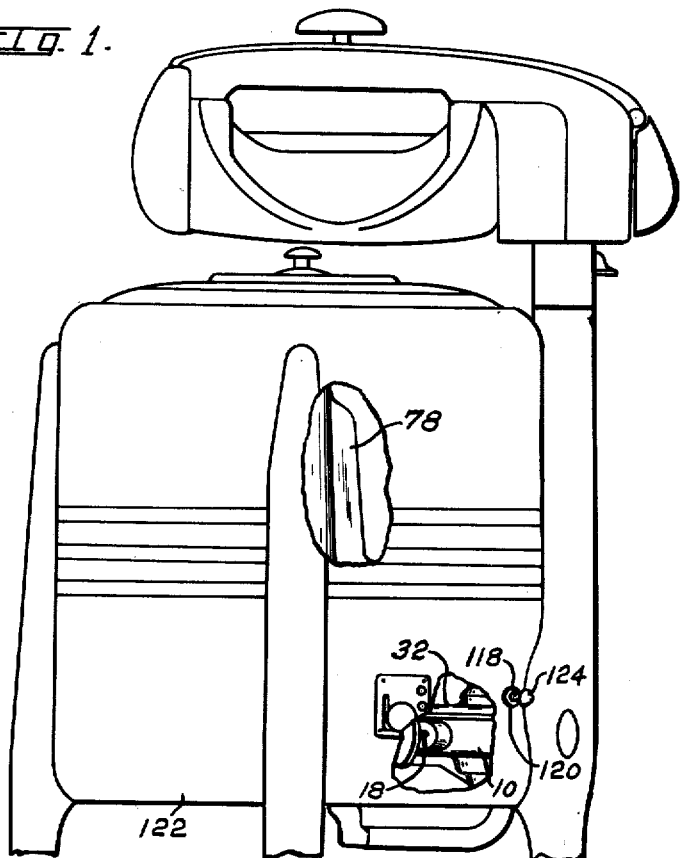
Figure 1 is a side elevation of an agitator type washing machine with parts broken away, and showing the clutch control in relation to the transmission.
Figure 2:
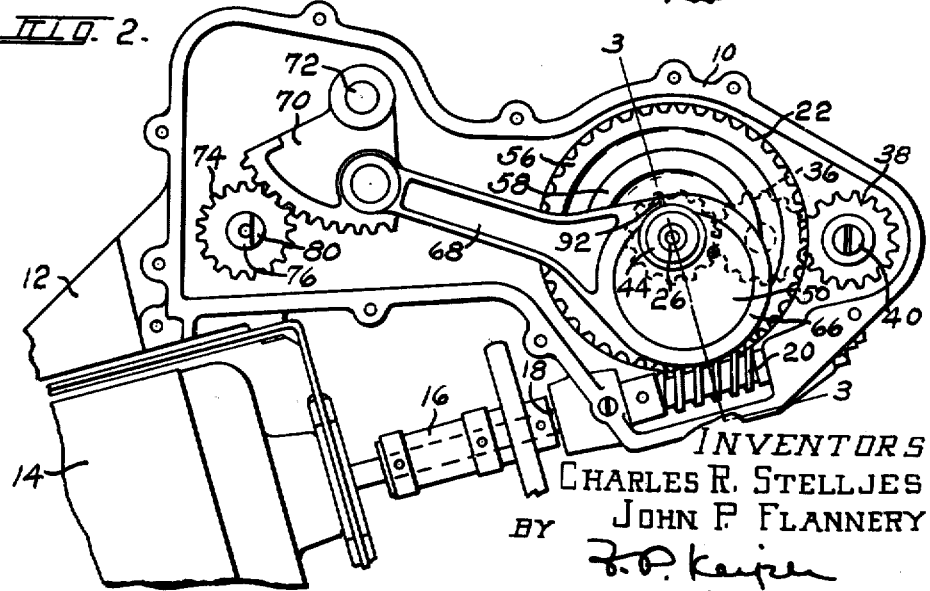
Figure 2 is a top plan view of the transmission with the top casing cover removed.

Referring principally to Figures 2 and 3, there is shown a transmission for providing oscillating agitator movement in a washing machine similar to that shown in Geldhof Patent No. 2,111,143, the showing, however, being applied to a wringer type washing machine for purposes of simplification. There is shown a lower gear casing member 10 having mounted on a bracket 12 a motor 14, such motor driving through a resilient coupling 16, a worm shaft 18, and a worm 20 within the casing 10. As shown in Figure 3 particularly, the worm engages a worm wheel 22 pinned as at 24 to a hollow vertical spindle 26, such spindle being journaled at its lower end in a pocket 28 in the casing 10. Such spindle is also journaled at its upper end in a pocket 30 formed in the upper casing member 32. It will be understood that such casing members 10 and 32 are secured together in a manner well known in the art, and form an oil-tight casing and oil reservoir for the gearing and linkage enclosed.

The worm wheel 22 may have on its lower hub a drive pinion 34, which operates through a train of pinions 36 and 38 to drive an upwardly extending wringer control shaft 40. The upper casing member 32 is provided with an enlarged cavity 42 beneath the journal 30 to receive a pair of clutch members 44 and 46, the former being keyed to the shaft 26 by a transverse pin 48, and the latter being formed as a part of an integral hub of an eccentric 50 riding upon the upper face 52 of the worm wheel 22 and immediately beneath the under face 54 of the upper casing 32. In practice, the worm wheel 22 is provided with annular face rings 56 and 58 for bearing against the eccentric 50 and the ring 66 of a connecting rod 68 riding upon the eccentric, and the upper casing 32 is provided with face rings 60 and 64, likewise adapted to engage the eccentric and ring 66 of the connecting rod. The connecting rod 68 extends to a sector gear 70 pivoted at 72, which sector gear drives a pinion 74 keyed to a vertical shaft 76, the latter extending upward into the tub to drive an oscillating agitator 78, such agitator being keyed thereto by the inclined flat 80 on the upper end of the shaft 76.

The clutch members 44 and 46 are provided with aligned cylindrical surfaces 82 and 84 bounded by shoulders 86 and 88, and positioned upon the cylindrical surfaces 82 and 84 is a helical coil spring clutch member formed preferably of resilient rectangular section wire. The clutch formed by the coil spring 90 and cylindrical faces 82 and 84 is of the commonly known L. G. S. type. The upper end turn of the coil spring 90 is provided with a radial extension 92 for actuation purposes, as will appear hereinafter. The cylindrical faces 82 and 84 may be provided with elemental grooves 94 to facilitate proper lubrication at all times. The helical wrap of the turns of the coil spring will be such that upon rotation of the shaft 26 in a counterclockwise direction looking down from the top (see Figure 4), such coil spring will, by frictional grip upon the cylindrical surfaces 82 and 84, cause itself to wrap more tightly upon such cylindrical surfaces, whereby to provide a positive drive from the member 44 to the hub member 46 of the eccentric 50. The coil spring, while tightly tensioned into engagement with both cylindrical surfaces 82 and 84, is otherwise free upon the members.

In order to control the clutch and cause the same to release, there is provided a vertical push pin 96 projecting through a bore 98 laterally positioned with respect to the journal 30, such push pin having a head member 100 on its lower end adapted to be moved into the plane of the radial end 92 of the coil spring 90. A coil spring arranged upon the pin 96 and seated in a pocket 102 and bearing against the head 100 tends to lower such pin so as to normally bring the head into the plane of the upper turn of the coil spring 90. The pin 96 projects upwardly above the top surface 104 of the casing member 32, and is provided with an adjustable shoulder in the form of a washer 106 backed by lock nuts 108. Riding upon the surface 104 and underneath the shoulder 106 is a U-shaped strap member 110 having cam surfaces 112 located intermediate flat dwell surfaces 114 and 116 at either end, whereby upon movement of the strap member from the position shown in Figure 5 to a position to the left thereof, the washer 106 may ride the cam 112 and seat upon the dwell surface 116, thereby permitting the pin head 100 to position itself in the path of the radial spring end 92.

The U-member may be conveniently attached to a control rod 118 extending through a guide grommet 120 in the lower outer casing 122 of the washing machine skirt, such rod terminating in a knob 124 whereby such rod may be conveniently manipulated from the position shown in Figure 5 to the position described, whereby the pin head 100 is moved into the path of the radical clutch arm or extension 92.

It will be understood that it is common practice for the motor 14 to operate continuously in washing machines of the type described, since it is desirable from time to time to operate the wringer or agitator, either singly or together, so that a convenient means for disconnecting the agitator is highly desirable. Through the arrangement thus shown, the manual control button 124 with little effort moves the pin head 100 either out of the path of the radial spring extension 92, whereby continuous drive from the worm gear to the eccentric is provided, or into the path of the extension whereby the clutch spring is caused to unwrap from the clutch member 44, releasing such clutch spring from the cylindrical surface 82, so that drive to the agitator is stopped.

The vertical shaft 26 is provided with a helical oil groove 126 leading from a point between the lower end face of the pinion 34 and the upper end of the lower casing boss 128, to a groove in the lower end of the shaft. The shaft is in turn supported by an adjustable ball thrust bearing 130 acting upon an end thrust washer 132 tending to close the end of the shaft 26. The rotation of the shaft 26 in the direction of the arrow indicated in Figure 4 sweeps oil carried in the transmission casing acting as a reservoir downwardly to the end of the shaft 26, whence such oil flows upwardly through the shaft bore 134 to the upper end, the upper end of the shaft exteriorly thereof being provided with a helical groove 136 similar to the groove 126 at the lower end. Such helical groove terminates adjacent the upper end face of the clutch member 44. The transverse pin 48 securing the clutch member 44 to the shaft 26 may be of the C-sectioned type, and thereby provide a transverse oil passage, permitting oil to escape from within the shaft to the outside of the clutch member 44, whence such oil may flow downwardly to continuously lubricate the helical clutch spring 90. The worm wheel and clutch member being secured to the shaft by pins 24 and 48, are thus supported from the shaft, and the end thrust bearing. Also the clutch members 44 and 46 are thus held against axial separation.

In Figure 7, there is shown a modification utilizing an annular plate 138 mounted upon the shoulder 140 of the clutch member 44, such plate being freely rotatable thereon and being secured in position immediately beneath the projecting ends 142 of the cross pin 48. Such plate is provided with a plurality of notches 144 adapted to receive the head 100 of the control pin 96, and such plate is provided with a struck-down finger 146 adapted to extend into the path of the radial extension 92 of the coil spring clutch member. Through utilization of such a plate, which normally rotates with the extension 92 of the coil spring when such coil spring is rotating, the clutch may be disengaged at any one of a plurality of points depending on the number of notches 144, so that clutch release operation is expedited, not requiring as much as a full rotation for release, as in some instances would be the case with the form shown in Figure 3.

While a single embodiment of the invention and a modification thereof have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In an agitator drive control for washing machines, a driving gear, a shaft for supporting said gear, an eccentric mounted on said shaft, and freely rotatable relative to said gear, said eccentric and gear having contacting bearing faces, and helical spring clutch means mounted upon and concentric with said shaft, and including a helical resilient clutch member, for coupling said eccentric to said gear on rotation in one direction a peripherally notched circular member journaled coaxially about said said shaft adjacent one end of said helical clutch member, and having means for engaging one end of the clutch member, and stationary control means for entering a notch of said circular member stopping the rotation of one end of said helical clutch spring to uncouple the clutch means.

2. In an agitator drive control for washing machines, a transmission casing having top and bottom walls, a vertical spindle having its opposite ends journaled in said top and bottom walls, a worm wheel affixed to said spindle for rotation therewith, said worm wheel having a planar bearing face on its upper side, an eccentric freely journaled on said spindle and having a planar lower face adapted to bear upon the worm wheel bearing face, a hub having a cylindrical surface affixed to said eccentric, a collar affixed to said spindle adjacent said hub, said collar having a cylindrical surface in alignment with the hub surface, said collar and worm wheel acting as thrust members for axially holding said eccentric in position on said spindle, a bearing face on the inside surface of said top wall adapted to bear against the upper surface of said eccentric, a helical resilient clutch spring extending over said cylindrical surfaces, said spring having a radial outwardly extending extension at one end, a peripherally notched circular member journaled in respect to said spindle and disposed adjacent the extension end of said spring, said circular member having means to engage said extension and a stop member slidably mounted in said top casing wall, adapted to be projected into and out of the path of the notched periphery of said member.

3. In an agitator drive control for washing machines, a transmission casing having top and bottom walls, a vertical hollow spindle having its opposite ends journaled in said top and bottom walls, a worm wheel affixed to said spindle for rotation therewith, said worm wheel having a planar bearing face on its upper side, an eccentric freely journaled on said spindle and having a planar lower face adapted to bear upon the worm wheel bearing face, a hub having a cylindrical surface affixed to said eccentric, a collar affixed to said spindle adjacent said hub, said collar having a cylindrical surface in alignment with the hub surface, said collar and worm wheel acting as thrust members for axially holding said eccentric in position on said spindle, a helical resilient clutch spring extending over said cylindrical surfaces, said spring having a radial outwardly extending extension at one end, a peripherally notched circular member journaled in respect to said shaft, and having a projection lying in the path of said extension a stop member slidably mounted in said top casing wall, adapted to be projected into and out of the notches of said circular member, means effective on rotation of said spindle for establishing a flow of lubricant up through said hollow spindle, and radial channel means above said helical clutch spring connecting with the hollow spindle for delivering a continuous supply of lubricant to said spring and cylindrical surfaces.

(References on following page)

References Cited in the file of this patent

UNITED STATES PATENTS

| | | |
|---|---|---|
| 1,725,351 | Hersh | Aug. 20, 1929 |
| 2,019,564 | Frantz | Nov. 5, 1935 |
| 2,095,370 | Reama | Oct. 12, 1937 |
| 2,124,115 | Miller | July 19, 1938 |
| 2,267,786 | Chayie | Dec. 30, 1941 |
| 2,643,749 | Greenlee | June 30, 1953 |
| 2,660,899 | McCammon | Dec. 1, 1953 |

FOREIGN PATENTS

| | | |
|---|---|---|
| 568,991 | Great Britain | Apr. 30, 1945 |